United States Patent
Nuka et al.

(10) Patent No.: US 11,635,293 B2
(45) Date of Patent: Apr. 25, 2023

(54) MEASURING APPARATUS

(71) Applicant: Mitutoyo Corporation, Kanagawa (JP)

(72) Inventors: Kuniyuki Nuka, Tokyo (JP); Motonori Ogihara, Kanagawa (JP); Takeshi Kawabata, Kanagawa (JP); Kozaburo Suzuki, Tokyo (JP)

(73) Assignee: MITUTOYO CORPORATION, Kawasaki (JP)

( * ) Notice: Subject to any disclaimer, the term of this patent is extended or adjusted under 35 U.S.C. 154(b) by 18 days.

(21) Appl. No.: 16/903,051

(22) Filed: Jun. 16, 2020

(65) Prior Publication Data

US 2020/0393237 A1 Dec. 17, 2020

(30) Foreign Application Priority Data

Jun. 17, 2019 (JP) .............................. JP2019-112011

(51) Int. Cl.
*G01B 11/03* (2006.01)
*G01S 7/497* (2006.01)
(Continued)

(52) U.S. Cl.
CPC ............ *G01B 11/03* (2013.01); *G01B 11/005* (2013.01); *G01S 7/497* (2013.01); *G02B 27/0172* (2013.01)

(58) Field of Classification Search
CPC .......... G01S 17/42; G01S 17/66; G01S 17/86; G01B 11/005; G01B 11/03; G01B 27/0093; G02B 27/0172; G02B 27/017
See application file for complete search history.

(56) References Cited

U.S. PATENT DOCUMENTS 4,621,926 A * 11/1986 Merry .................. G01B 11/005
33/503
6,757,077 B1 * 6/2004 Iwane ...................... B41J 3/407
358/1.9
(Continued)

FOREIGN PATENT DOCUMENTS

| JP | 2007-57522 | 3/2007 |
| JP | 2010-054429 | 3/2010 |
| JP | 2011-064609 A | 3/2011 |

OTHER PUBLICATIONS

Japanese Office Action corresponding to JP 2019-112011, dated Feb. 21, 2023, 8 pages.

*Primary Examiner* — Sang H Nguyen
(74) *Attorney, Agent, or Firm* — Rankin, Hill & Clark LLP (57) ABSTRACT

It is an object of the present invention to provide a measuring apparatus capable of easily restoring the tracking state when the tracking state of the target is interrupted. One aspect of the present invention is a measuring apparatus that emits a light beam toward a target, captures and tracks the target, and measures the three-dimensional coordinates of the target. The measuring apparatus includes: a light source for emitting light beam; an angle control unit for controlling the emission angle of the light beam emitted from the light source so as to track the moving target; an imaging unit for capturing the target or the vicinity of the target, and a recognition unit for recognizing the target or the specific portion including the target from an image captured by the imaging unit. The angle control unit controls the emission angle of the light beam so as to emit light beam toward the target or the specific portion including the target recognized by the recognition unit when the tracking of the target is released.

8 Claims, 8 Drawing Sheets

(51) Int. Cl.
*G02B 27/01* (2006.01)
*G01B 11/00* (2006.01)

(56) References Cited

U.S. PATENT DOCUMENTS

| | | | | |
|---|---|---|---|---|
| 8,187,097 | B1* | 5/2012 | Zhang | A63F 13/52 |
| | | | | 463/37 |
| 8,282,485 | B1* | 10/2012 | Zhang | A63F 13/213 |
| | | | | 463/37 |
| 8,854,426 | B2* | 10/2014 | Pellman | A63F 13/42 |
| | | | | 348/45 |
| 2003/0235331 | A1* | 12/2003 | Kawaike | F16P 3/142 |
| | | | | 382/154 |
| 2007/0024861 | A1 | 2/2007 | Yanaka et al. | |
| 2008/0316497 | A1* | 12/2008 | Taketomi | G01C 15/002 |
| | | | | 356/498 |
| 2010/0208232 | A1* | 8/2010 | Hara | G01S 7/4811 |
| | | | | 356/4.09 |
| 2014/0111812 | A1* | 4/2014 | Baeg | G01S 7/4814 |
| | | | | 356/610 |
| 2016/0035136 | A1* | 2/2016 | Sendai | G06F 3/012 |
| | | | | 345/633 |
| 2016/0231420 | A1* | 8/2016 | Kryvobok | G01S 7/4817 |
| 2018/0129866 | A1* | 5/2018 | Hicks | H01S 5/18386 |
| 2019/0154805 | A1* | 5/2019 | Ohtomo | G01S 7/4972 |

* cited by examiner

MEASURING APPARATUS

CROSS-REFERENCE TO RELATED APPLICATION

This non-provisional application claims priority under 35 U.S.C. § 119(a) from Japanese Patent Application No. 2019-112011, filed on Jun. 17, 2019, the entire contents of which are incorporated herein by reference.

BACKGROUND

Technical Field

The present invention relates to a measuring apparatus for measuring three-dimensional coordinates of a target by capturing and tracking the target held by a measurer (a person who performs the measurement) with a light beam.

Background Art

As a measuring apparatus for measuring the three-dimensional coordinates of an object, there is a three-dimensional measuring apparatus for measuring the three-dimensional coordinates of a measurement point by irradiating a light beam such as a laser beam toward a target and capturing and tracking the moving target. With this measuring apparatus, the object such as a large structure can be easily and accurately measured by contacting the target in a tracking state to the surface of the object.

JP2007-057522A discloses a tracking type laser interferometer. In this tracking type laser interferometer, a laser beam is emitted toward a retroreflector which is an object to be measured, and displacement of the retroreflector is detected by utilizing interference of the laser beam reflected in the return direction by the retroreflector. At the same time, tracking is performed by using the angle change of the optical axis of the laser beam.

JP 2010-054429A discloses a laser tracker which is easy to use and can perform highly accurate measurement even if the measurement is interrupted while maintaining the required performance with a simple configuration. In this laser tracker, an optical position detecting means for outputting a signal corresponding to the direction of movement and the amount of movement when the target is moved in the direction perpendicular to the optical axis of the laser beam incident on the target. A rotation mechanism of the two axes are controlled so as to track the target using the signal output from the optical position detecting means.

SUMMARY OF THE INVENTION

Problems to be Solved by the Invention

In a measuring apparatus which performs measurement while tracking the target by irradiating a light beam, a so-called lost state may occur in which the target cannot be tracked for some reason. In this case, the measurer who holds the target needs to move the target to a position where the light beam can be received and restore the tracking state. However, since the trajectory of the light beam is hard to see, it is not easy to find the range in which the light can be received. Therefore, the measurer moves the target by relying on the intuition. In particular, in this type of measuring apparatus, the distance from the main body of the measuring apparatus to the object may be several tens of meters, it will take a lot of time to find a position where the light beam can be received as the distance increases.

It is an object of the present invention to provide a measuring apparatus capable of easily restoring the tracking state when the tracking state of the target is interrupted.

Means for Solving the Problems

One aspect of the present invention is a measuring apparatus that emits a light beam toward a target, captures and tracks the target, and measures the three-dimensional coordinates of the target. The measuring apparatus includes a light source for emitting light beam, an angle control unit for controlling the emission angle of the light beam emitted from the light source so as to track the moving target, an imaging unit for capturing the target or the vicinity of the target, and a recognition unit for recognizing the target or the specific portion including the target from an image captured by the imaging unit. The angle control unit controls the emission angle of the light beam so as to emit light beam toward the target or the specific portion including the target recognized by the recognition unit when the tracking of the target is released.

According to such a configuration, in the measuring apparatus for measuring apparatus that emits the light beam toward the target to capture and track the light beam, the imaging unit images an image in the vicinity of the target or target, and the recognition unit recognizes the target or the specific portion including the target from the image captured by the imaging unit. Then, when the tracking of the target is released, the emission angle is controlled so as to emit a light beam toward the target or the specific portion including the target recognized from the image. Thereby, it is possible to easily restore the tracking state.

In the above-described measuring apparatus, the recognition unit may recognize a face portion of the measurer who hold the target from the image as the specific portion including a target, and the angle control unit may control the emission angle of the light beam so as to emit the light beam toward a position other than the face portion recognized by the recognition unit. Thus, when the tracking of the target is released, since the light beam is emitted toward the position near the target and other than the face portion of the measurer who holds the target, it is possible to restore the tracking state by moving the target to the position of the light beam near the measurer.

In the above-described measuring apparatus, the recognition unit may recognize a contour area of the measurer who holds the target from the image, and the angle control unit may control the emission angle so that the light beam is emitted toward a specific position of the contour area recognized by the recognition unit. Thus, when the tracking of the target is released, since the light beam is emitted toward the specific position recognized from the contour area of the measurer, it is possible to restore the tracking state by moving the target to a position close to the measurer.

In the above-described measuring apparatus, the specific position may be in the vicinity of the center of gravity position in the contour area. Thereby, when the tracking of the target is released, since the light beam is emitted toward the center of gravity recognized from the contour area of the measurer, it is possible to restore the tracking state by moving the target near the center of the body of the measurer.

In the above-described measuring apparatus, the recognition unit may recognize the specific portion including the target, and the angle control unit may control the emission angle of the light beam so that the light beam is emitted toward a specific portion including the target recognized by the recognition unit. Thereby, when the tracking of the target is released, since the light beam is emitted toward the specific portion including the target recognized from the image, it is possible to easily restore the tracking state.

In the above-described measuring apparatus, the recognition unit may extract a specific motion from the image to recognize the measurer who holds the target. Thereby, when the tracking of the target is released, since the measurer is recognized based on the specific motion of the measurer and the light beam is emitted toward the recognized measurer, it is possible to restore the tracking state by moving the target to the position of the light beam near the measurer.

The above-described measuring apparatus may further comprise a light amount adjusting unit for reducing the amount of light of the light beam emitted from the light source when the tracking of the target is released. Since the measurement cannot be performed in a state in which the tracking of the target is released, the measuring apparatus does not need to emit useless amount of light.

The above-described measuring apparatus may further comprise a display unit that is wearable by a measurer who holds the target, and a display control unit that controls information displayed on the display unit. The display control unit may perform control to superimpose and display a guide image in the vicinity of the image of the target displayed on the display unit in order to emit the light beam toward the target. Thereby, since the guide image is superimposed and displayed on the display unit worn by the measurer, when the tracking state of the target is released, it is possible to restore the tracking state by moving the target along the guide image.

In the above-described measuring apparatus, the display control unit may perform control to superimpose and display an object image indicating a light receiving direction and a light receiving region of the target as the guide image on the image of the target. Thereby, when the tracking of the target is released, the light receiving direction and the light receiving region are displayed in a superimposed manner on the image of the target displayed on the display unit, and it becomes possible to restore the tracking state by moving the target using this guide image.

DETAILED DESCRIPTION OF THE EMBODIMENTS

Embodiments of the present invention will be described below with reference to the drawings. In the following description, portions already described are denoted by the same reference numerals, and description thereof is omitted.

[Configuration of the Measuring Apparatus]

Figure 1:
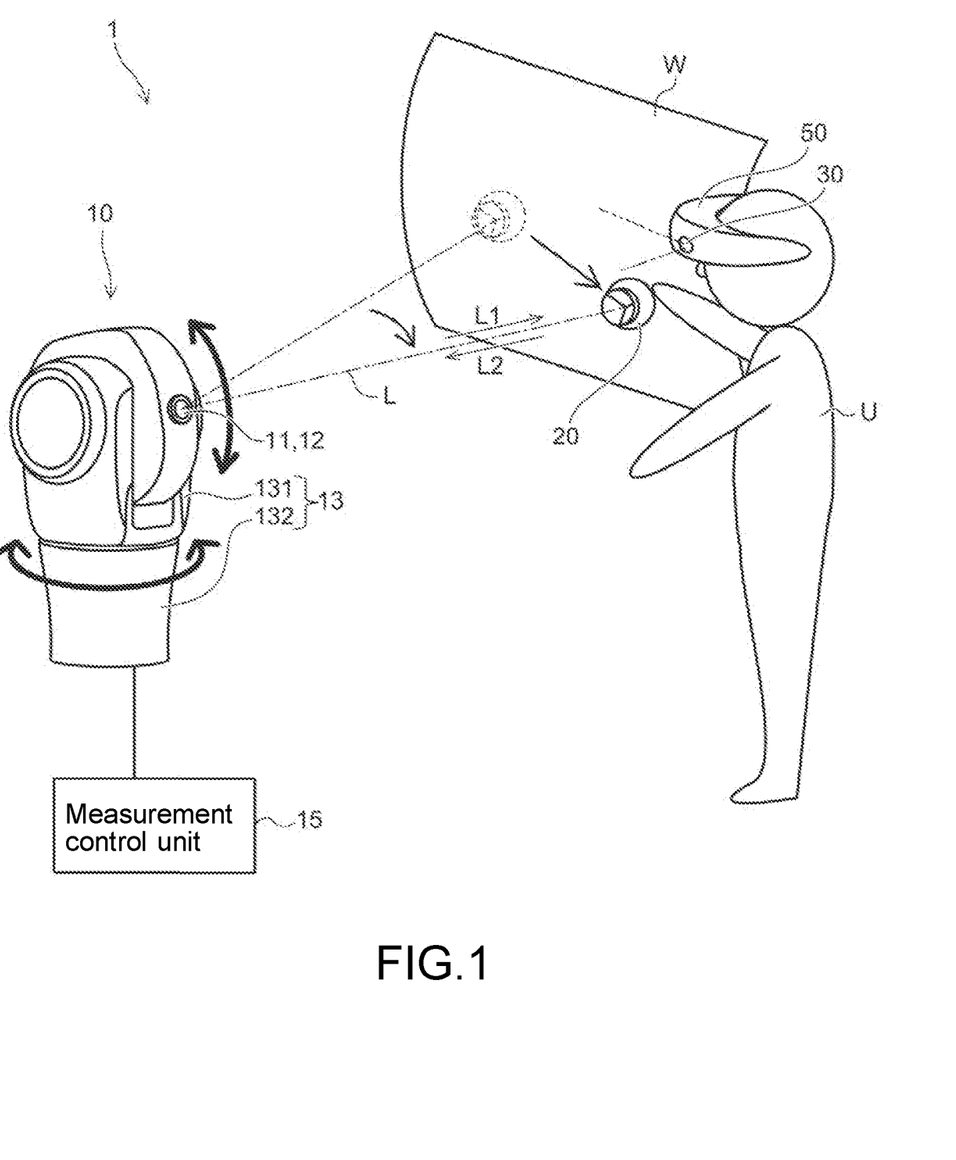
FIG. 1 is a schematic diagram illustrating a configuration of the measuring apparatus according to the present embodiment.

FIG. 1 is a schematic diagram illustrating a configuration of a measuring apparatus according to the present embodiment.

The measuring apparatus according to the present embodiment measures three-dimensional coordinates of the target 20 by emitting a light beam toward the target 20 held by the measurer U and capturing and tracking the target. When the target 20 is in the tracking state, the measuring apparatus 1 can measure the three-dimensional coordinates of the target 20. Therefore, by contacting the target 20 in the tracking state to the measurement point of an object W, three-dimensional coordinates of a measurement point of the object W can be obtained from the three-dimensional coordinates of the target 20.

The measuring apparatus 1 includes an apparatus body 10 constituting an optical interferometer. The apparatus body 10 is provided with a light source 11 for emitting a light beam, a light receiving unit 12 for receiving the light beam emitted from the light source 11 and reflected by the target 20, and a drive unit 13 for changing angles of the light source 11 and the light receiving unit 12. When tracking the target 20, the angles of the light source 11 and the light receiving unit 12 are changed by the drive unit 13 so that the light beam emitted from the light source 11 is always irradiated to the target 20.

A measurement control unit 15 is connected to the apparatus body 10. Each part of the apparatus body 10 is controlled by the measurement control unit 15. The measurement control unit 15 may be configured by a personal computer. The configuration of the measurement control unit 15 will be described later.

As the light beam emitted from the light source 11 of the apparatus body 10, for example, laser beam L is used. For convenience of explanation, the laser beam L emitted from the light source 11 will be referred to as laser beam L1, and the laser beam L reflected by the target 20 will be referred to as laser beam L2.

The target 20 is, for example, a retroreflector. When the laser beam L1 emitted from the light source 11 is reflected by the target 20, the laser beam L2 returns to the apparatus body 10 along the same optical path as the laser beam L1. The light receiving unit 12 of the apparatus body 10 controls the drive unit 13 so as to track the moving target 20 using the interference between the laser beams L1 and L2 while measuring the distance between the apparatus body 10 and the target 20.

The drive unit 13 includes a first drive unit 131 for changing the angles of the light source 11 and the light receiving unit 12 around the first axis and a second driving unit 132 for changing the angles of the light source 11 and the light receiving unit 12 around the second axis perpendicular to the first axis. For example, the first drive unit 131 is an azimuth encoder for changing the azimuth angle, the second drive unit 132 is an elevation encoder for changing the elevation angle. When tracking the target 20, the first drive unit 131 and the second drive unit 132 are interlocked to adjust the emission angle (azimuth angle and elevation angle) of the light source 11 so that the laser beam L1 is always irradiated to the target 20.

When measuring the three-dimensional coordinates of the object W, the measurer U holds the target 20 and bring the target 20 into contact with the measurement point of the object W. The three-dimensional coordinates of the target 20 are measured at a predetermined timing while the target 20 is being tracked by the apparatus body 10. After the measurement of one measurement point is completed, the measurer U moves the target 20 to the next measurement point. During this movement, the apparatus body 10 continues to track the target 20, and measures the three-dimensional coordinates of the target 20 while the target 20 moves to the next measurement point. By repeating this process, the three-dimensional coordinates of the object W can be measured.

The measuring apparatus 1 according to the present embodiment includes an imaging unit 30. The imaging unit 30 captures an image of the measurer U or the vicinity of the measurer U. The imaging unit 30 may be provided on the head-mounted display 50 worn by the measurer U, or may be provided on the apparatus body 10. Further, the imaging unit may be provided separately from the head-mounted display 50 and the apparatus body 10. In the present embodiment, an example in which the imaging unit 30 is provided in the head-mounted display 50 will be described.

[Block Configuration of the Measuring Apparatus]

Next, a block configuration of the measuring apparatus 1 will be described.

Figure 2:
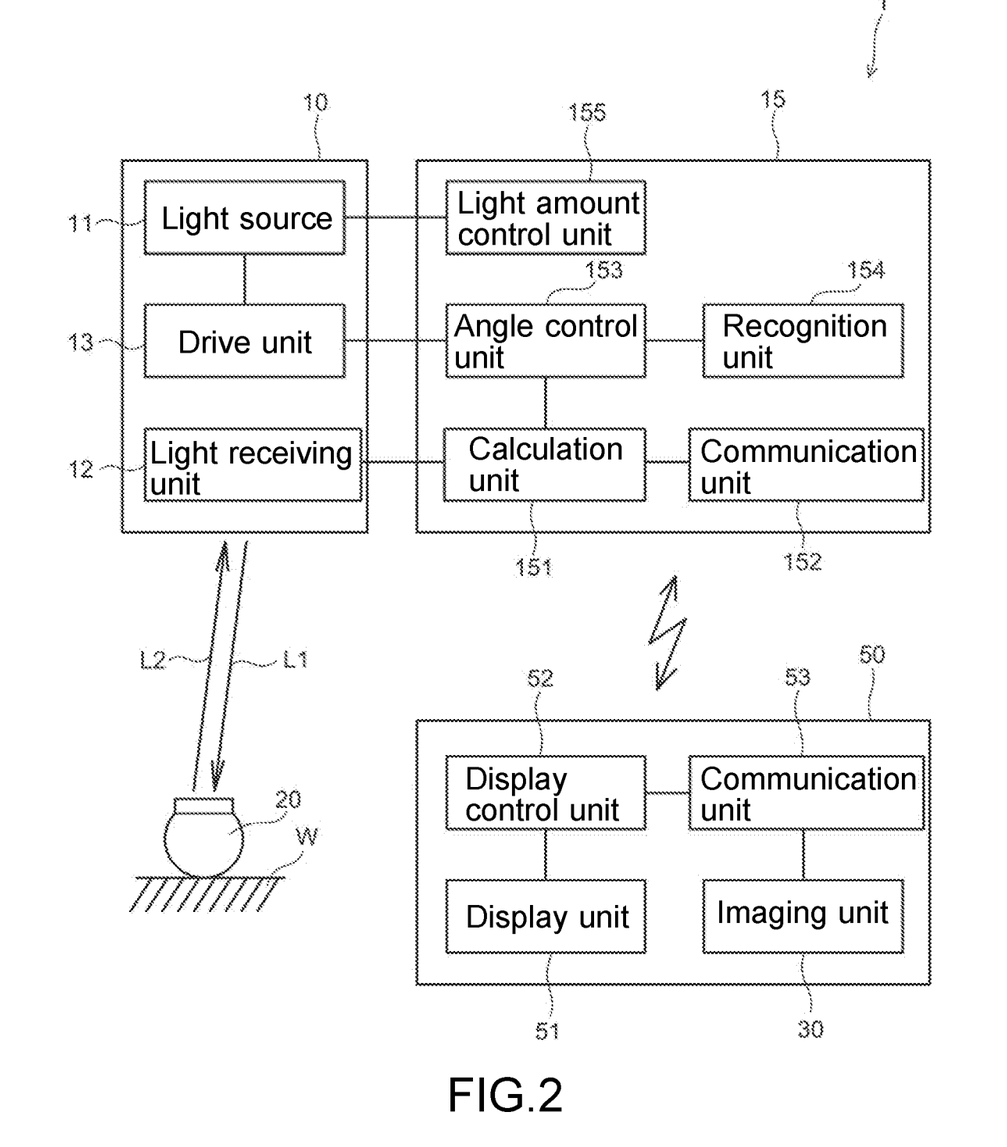
FIG. 2 is a block diagram illustrating a configuration of the measuring apparatus according to the present embodiment.

FIG. 2 is a block diagram illustrating a configuration of the measuring apparatus according to the present embodiment.

The measurement control unit 15 of the measuring apparatus 1 has a calculation unit 151, a communication unit 152, an angle control unit 153, the recognition unit 154 and the light amount control unit 155. The calculation unit 151 calculates the three-dimensional coordinates based on a signal output from the light receiving unit 12 that has received the laser beam L2. The communication unit 152 performs information communication with external devices by wireless or wired communication. The communication unit 152 performs information communication with, for example, the head-mounted display 50.

The angle control unit 153 controls the angle of the light source 11 by controlling the drive unit 13. The angle control unit 153 gives angle setting signals to each of the first drive unit 131 and the second drive unit 132 of the drive unit 13 in order to adjust the angle of the light source 11 (the emission angle of the laser beam L1) for tracking the target 20 based on the signal sent from the calculation unit 151.

The recognition unit 154 recognizes the specific portion including the measurer U or the target from an image captured by the imaging unit 30. The recognition unit 154 may recognize the specific portion including the measurer U or the target by the image recognizing process, or may obtain the three-dimensional coordinates of the specific portion including the measurer U or the target based on the image obtained by the imaging unit 30. The recognizing process in the recognition unit 154 will be described later.

The light amount control unit 155 controls the amount of light of the laser beam L1 emitted from the light source 11. That is, the light amount control unit 155 sends a signal for light amount control to the light source 11 based on a predetermined condition, and controls the amount of emitted light of the laser beam L1.

The head mount display 50 includes a display unit 51, a display control unit 52 and the communication unit 53. In the present embodiment, the imaging unit 30 is provided in the head-mounted display 50. The display unit 51 displays an image captured by the imaging unit 30, information sent from the measurement control unit 15, and various other information. The display control unit 52 controls the display unit 51. That is, the display control uni 52 send information to the display unit 51 to control the content to be displayed.

The communication unit 53 performs information communication with external devices by wireless or wired communication. The communication unit 53 performs information communication with, for example, the measurement control unit 15.

[Operation of the Measuring Apparatus]

Next, the operation of the measuring apparatus 1 according to the present embodiment will be described.

Figure 3:
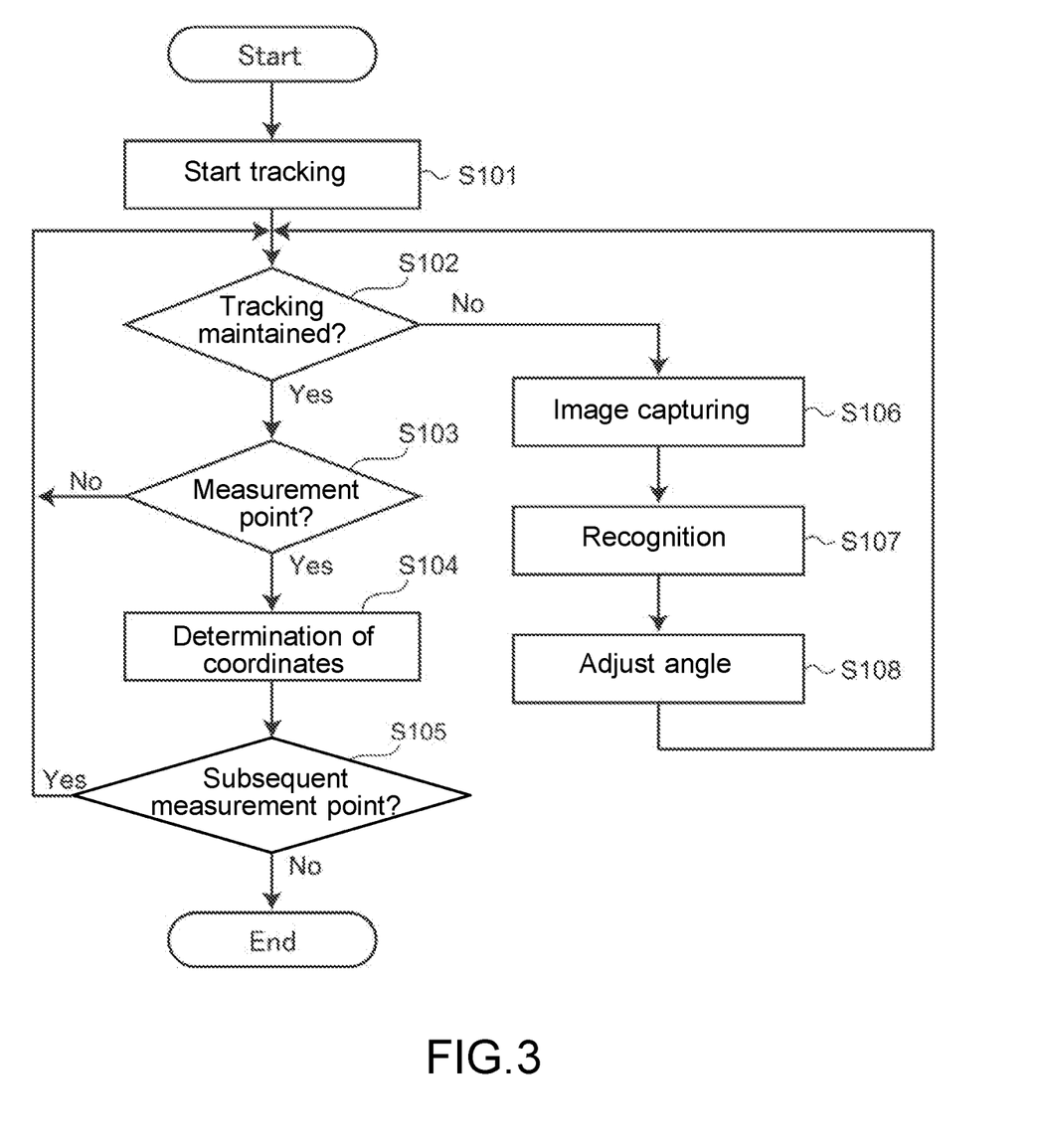
FIG. 3 is a flowchart illustrating the operation of the measuring apparatus according to the present embodiment.

FIG. 3 is a flowchart illustrating the operation of the measuring apparatus according to the present embodiment.

Figure 4:
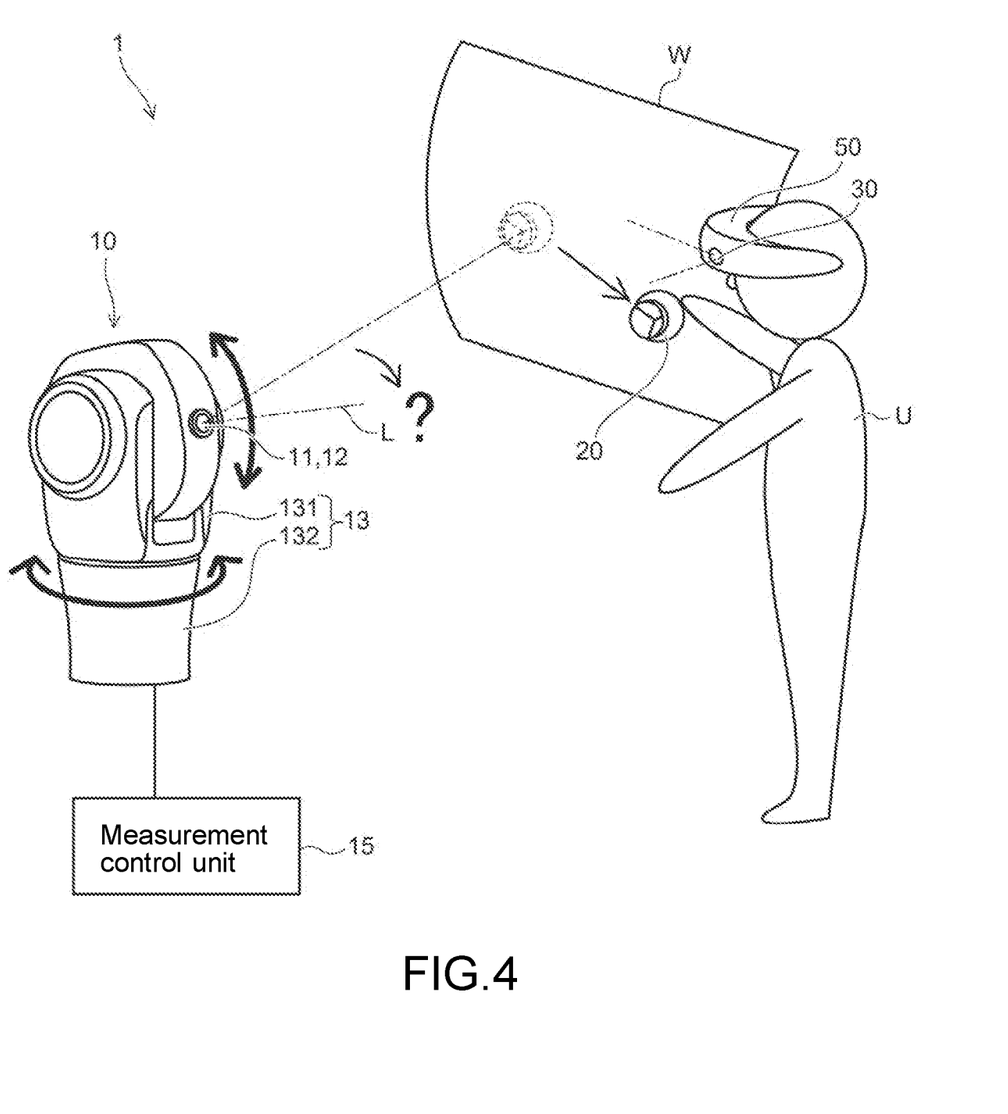
FIG. 4 is a schematic diagram illustrating the operation of the measuring apparatus.

FIG. 4 is a schematic diagram illustrating the operation of the measuring apparatus.

First, as shown in step S101 of FIG. 3, tracking is started. That is, the laser beam L1 is emitted from the light source 11 of the measuring apparatus 1, and the laser beam L2 reflected by the target 20 is received by the light receiving unit 12. A received light signal is processed by the calculation unit 151, and the calculation unit 151 gives an instruction to the angle control unit 153 so that continuously controls the angles of the light source 11 and the light receiving unit 12 to track the target 20.

In the tracking state, even if the target 20 held by the measurer U is moved, the angles of the light source 11 and the light receiving unit 12 are controlled in accordance with the movement, and the laser beam L1 is continuously emitted toward the target 20. In a state in which the target 20 is tracked, the three-dimensional coordinates of the target 20 are always calculated. That is, the laser light L2 reflected by the target 20 is received by the light receiving unit 12, and the three-dimensional coordinates of the target 20 are calculated based on the distance from the apparatus body 10 to the target 20 and the angles of the light source 11 and the light receiving unit 12. This calculation is performed by the calculation unit 151.

Next, as shown in step S102 of FIG. 3, it is determined whether tracking is maintained. If the tracking is maintained, it is determined whether or not the target 20 is located at the measurement point of the object W, as shown in step S103. For example, it is determined that the position of the target 20 is at the measurement point when the target 20 stops for a predetermined time. Alternatively, it may be determined that the target 20 is at the measurement point at the timing when a predetermined trigger signal is issued.

If it is determined that the target 20 is at the measurement point, the determination of the coordinates is performed as shown in step S104. That is, the three-dimensional coordinates of the target 20 is always calculated during the tracking state of the target 20. When it is determined that the target 20 is at the measurement point, the three-dimensional coordinates at the timing is determined as the coordinates of the measurement point.

After the measurement, as shown in step S105, it is determined whether or not there is a subsequent measurement point. If there is a subsequent measurement point, the process returns to step S102 and the subsequent steps are repeated.

Here, if the tracking of the target 20 is released for some reason while such measurements are being performed, it is determined No in step S102. FIG. 4 shows a state in which the tracking is released. In this case, the emission direction of the laser beam L1 does not follow the target 20, and the angles of the light source 11 and the light receiving unit 12 remain at that position. This is the so-called lost state.

When the tracking is released, image capturing is performed as shown in step S106. That is, the imaging unit 30 captures an image of the measurer U or the vicinity of the measurer U. If the imaging unit 30 is provided on the head-mounted display 50 worn by the measurer U, the measurer U may capture the image by looking at the target 20 or the hand holding the target 20 by himself. If the imaging unit 30 is provided in the apparatus body 10, an image of the measurer U or the vicinity of the measurer U is captured from the imaging unit 30 of the apparatus body 10.

Figure 5A:
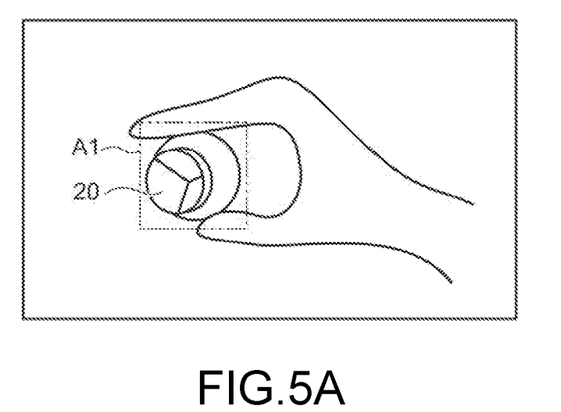
FIGS. 5A to 5C are schematic diagrams illustrating the recognizing process.
Figure 5B:
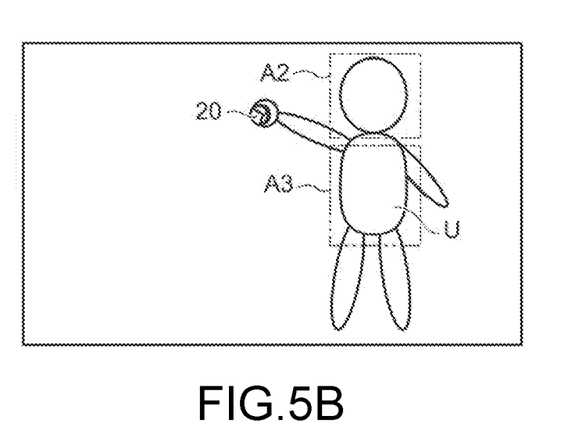
Figure 5C:
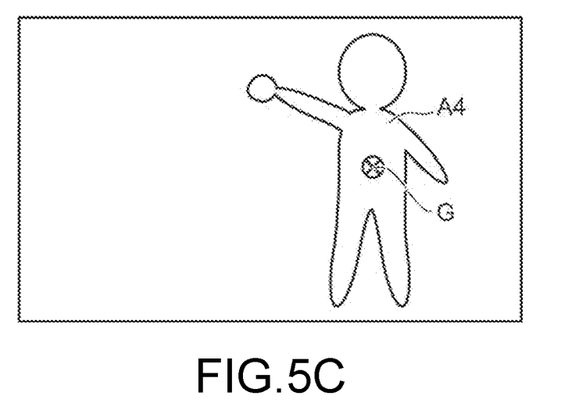

Next, as shown in step S107, recognition is performed. The recognition unit 154 recognizes the specific portion including the measurer U or the target from an image captured by the imaging unit 30. FIGS. 5A to 5C are schematic diagrams illustrating the recognizing process. FIG. 5A shows the recognizing process when an image of the target 20 that the measurer holds with his/her own hand is captured. In this case, the image captured by the imaging unit 30 of the head-mounted display 50 is sent from the communication unit 53 to the apparatus body 10 via the communication unit 152 of the measurement control unit 15. The recognition unit 154 recognizes a region A1 of the target 20 in the image based on the feature of the shape of the target 20 from the sent image. Further, the recognition unit 154 recognizes the three-dimensional coordinates of the region A1 based on the image sent from the head-mounted display 50 and/or other information (such as distance measurement information).

FIG. 5B shows the recognizing process when the measurer U or the vicinity of the measurer U is captured by the imaging unit 30 provided on the apparatus body 10 or provided outside. In this case, a person is recognized from the captured image.

When a plurality of persons are recognized, a person holding the target 20 in the hand may be a recognition target. In addition, when a person performs a specific motion (a specific gesture), the motion may be recognized, and the person who performed the specific motion may be the recognition target.

The recognition unit 154 recognizes a region A2 of the face and a region A3 other than the face, for example, the body part, from the image of the recognized person. Then, the recognition unit 154 recognizes the three-dimensional coordinates of the regions A2 and A3 based on the image captured by the imaging unit 30 and/or other information (such as distance measurement information).

FIG. 5C shows a process of extracting a contour of the person from the image captured by the imaging unit 30 provided in the apparatus main body 10 or provided outside of the measuring apparatus 1. In this case, a region A4 of the contour of the person is recognized from the captured image. Further, the recognition unit 154 recognizes the center of gravity position G from the region A4 of the contour of the recognized person. Then, the recognition unit 154 recognizes the three-dimensional coordinates of the regions A4 and the center of gravity position G based on the image captured by the imaging unit 30 and/or other information (such as distance measurement information).

Next, as shown in step S108 of FIG. 3, the emission angle of the light source 11 is adjusted. That is, based on the information recognized by the previous step S107, the recognition unit 154 gives an instruction to the angle control unit 153 to control the drive unit 13 to control the direction of the laser beam L1 emitted from the light source 11.

For example, when the region A1 of the target 20 shown in FIG. 5A is recognized, the recognition unit 154 gives an instruction to the angle control unit 153 to emit the laser beam L1 toward the three-dimensional coordinates of the target 20, and the drive unit 13 adjusts the angles of the light source 11 and the light receiving unit 12.

When the regions A2 and A3 of the person shown in FIG. 5B are recognized, the angles of the light source 11 and the light receiving unit 12 are adjusted based on the three-dimensional coordinates of the recognized ranges A2 and A3. In this case, for safety, it is preferable to avoid the angle at which the laser beam L1 is emitted to the face region A2 and to adjust the angle so that the laser beam L1 is emitted to the region A3 of the body part.

Further, if the person's specific motion (specific gesture) is recognized, the measurer U can perform the specific motion to positively inform the recognition unit 154 of his/her position and induce to emit the laser beam L1 to a position close to himself/herself.

When the center of gravity position G of the person shown in FIG. 5C is recognized, the recognition unit 154 gives an instruction to the angle control unit 153 to emit the laser beam L1 toward the three-dimensional coordinates of the center of gravity position G, and the drive unit 13 adjusts the angles of the light source 11 and the light receiving unit 12.

In either example, the angles of the light source 11 and the light receiving unit 12 are adjusted so that the laser beam L1 is emitted to the vicinity of the measurer U and the target 20, and the direction of the laser beam L1 can be automatically adjusted to a range in which the target 20 can be easily tracked. Thus, since the laser beam L1 is emitted to the position close to the measurer U or the vicinity of the target 20, the measurer U can easily find a region where the target 20 can be tracked by slightly moving the holding target 20 near himself/herself.

Next, the process returns to the step S102 of FIG. 3, and it is determined whether or not tracking is in progress. If tracking is in progress, the measurement from step S103 to step S105 is performed. If tracking is not in progress, steps S106 to S108 are repeated until the tracking state is restored.

By such an operation, when the tracking of the target 20 is released, the emission angle is controlled so as to emit light beam L1 toward the measurer U or the specific portion including the target recognized from the image. Therefore, when the tracking of the target 20 is released, the measurer U does not need to search around the position of the laser beam L1 to return to the tracking state, the laser beam L1 is directed to the vicinity of himself/herself so as to be easily restored the tracking state.

For example, as shown in FIG. 5A, by adjusting the emission direction of the laser beam L1 based on recognized position of the target 20, it can be restored the tracking state without moving target 20 significantly. Further, as shown in FIGS. 5B and 5C, by adjusting the emission direction of the laser beam L1 toward the region A3 of the body portion of the measurer U or the center of gravity position G, the measurer U can easily grasp the position of the laser beam L1 irradiated to his/her body portion, and for example, by moving the target 20 around the center of his/her body, it is possible to restore the tracking state easily.

Note that, the light amount control unit 155 may control light source 11 to reduce the amount of light when the tracking of the target 20 is released. That is, by decreasing the amount of light of the light source 11 at the stage where so-called loss occurs, it is possible to suppress the laser beam L1 from emitting light with a useless amount until the tracking state is restored.

[Example of Guide Operation]

Next, an example of guiding operation in the measuring apparatus 1 according to the present embodiment will be described.

Figure 6:
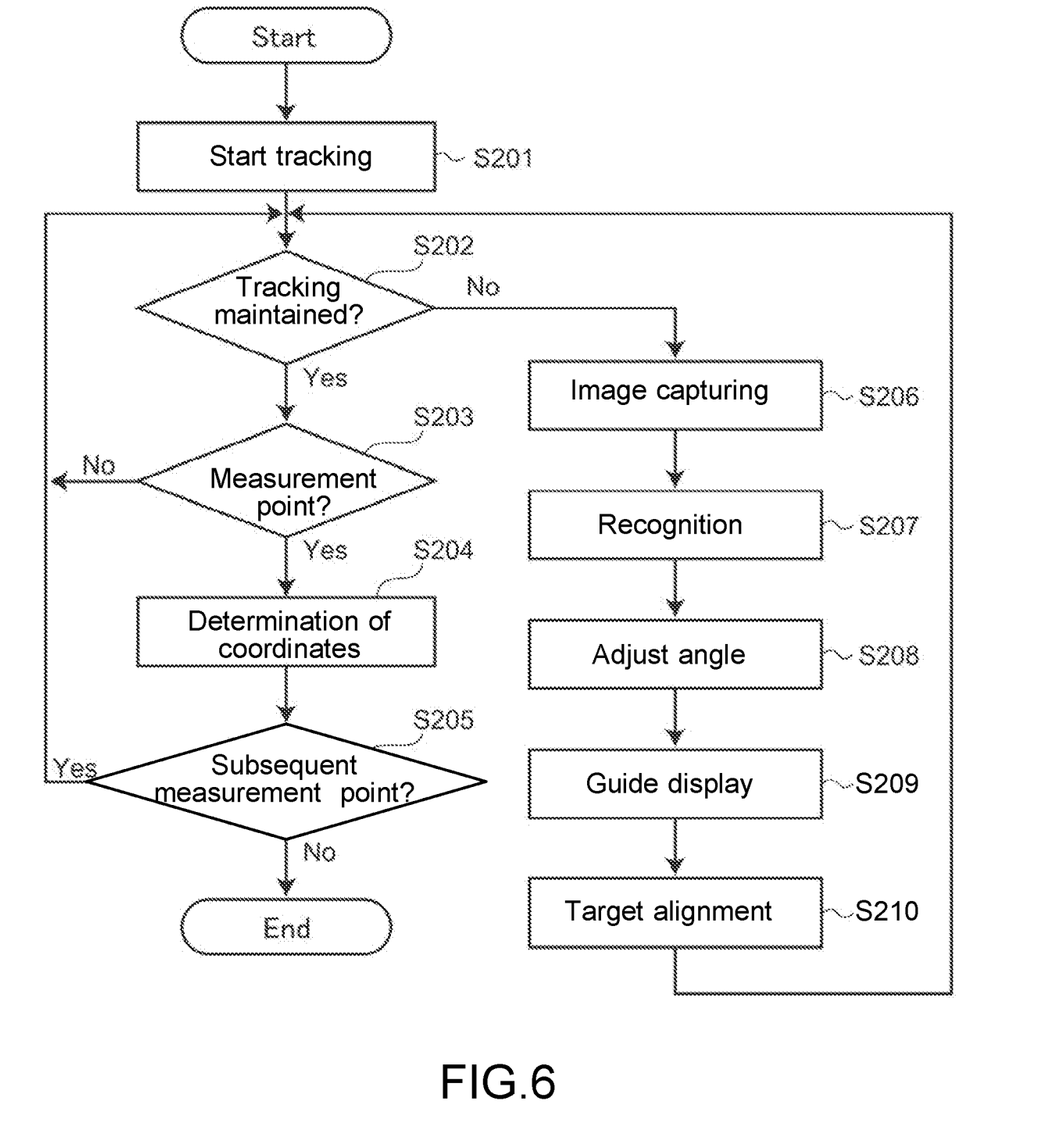
FIG. 6 is a flowchart illustrating a guiding operation.

FIG. 6 is a flowchart illustrating a guiding operation.

Figure 7:
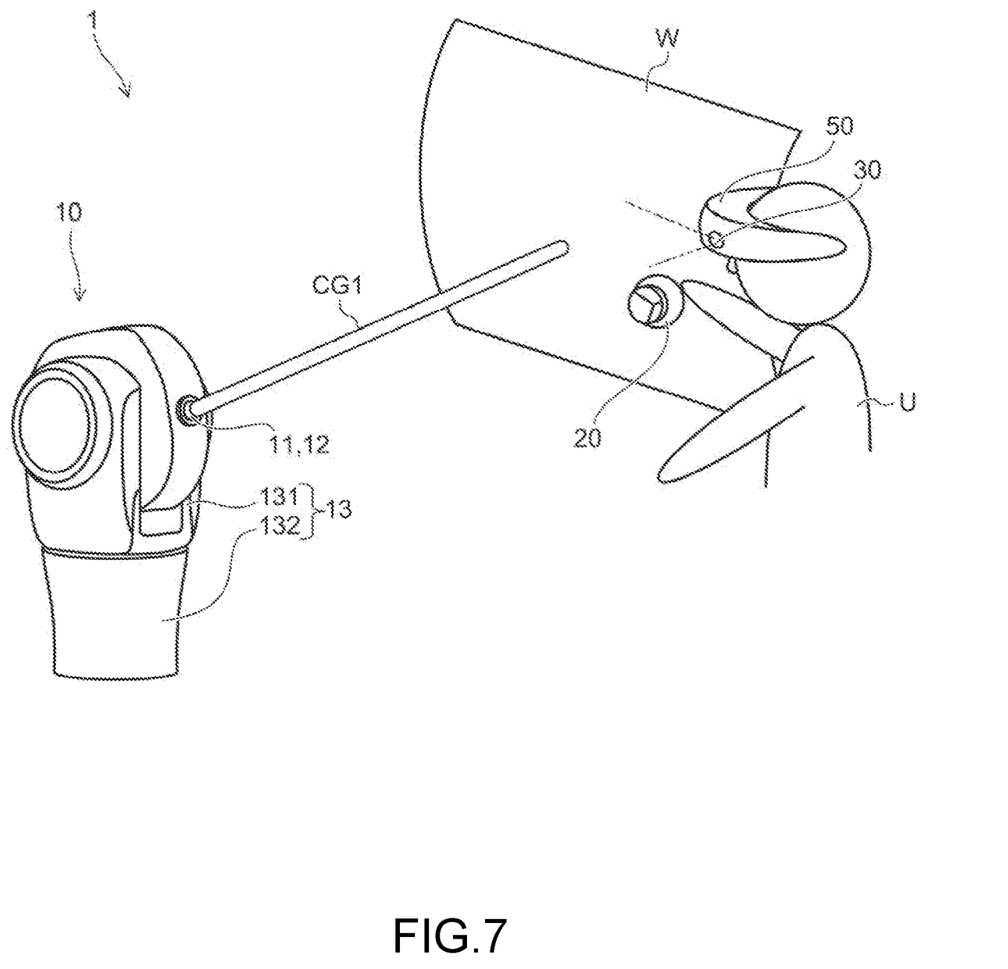
FIG. 7 is a schematic diagram illustrating the guiding operation.
Figure 8A:
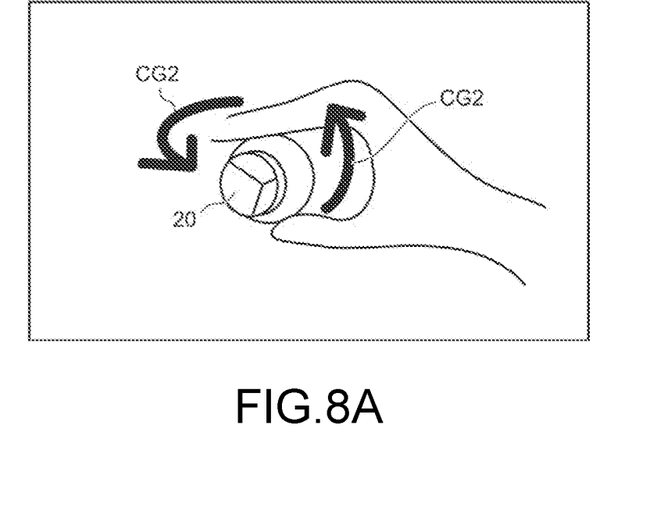
FIGS. 8A and 8B are schematic diagrams illustrating the guiding operation.
Figure 8B:
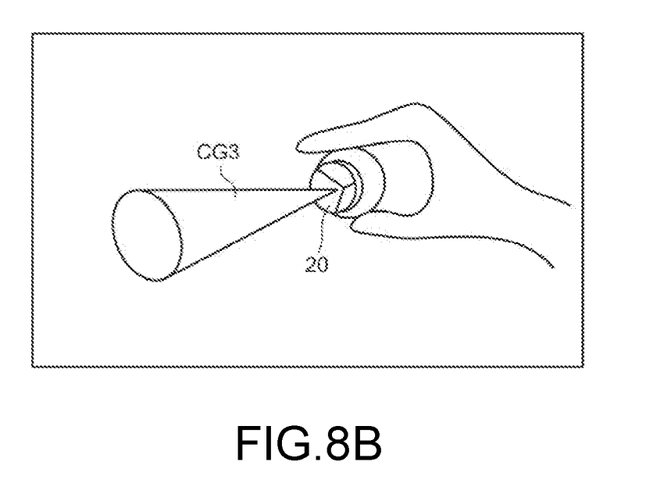

FIGS. 7, 8A and 8B are schematic diagrams illustrating the guiding operation.

Since the processing from steps S201 to S208 shown in FIG. 6 are the same as the processing from steps S101 to S108 shown in FIG. 3, descriptions thereof are omitted.

The tracking of the target 20 is released (No in the determination in step S202), the imaging unit 30 captures an image (step S206), and the recognizing process (step S207) and the angle adjustment of the light source 11 and the light receiving unit 12 (step S208) are performed. Then, the guide display shown in step S209 is performed. That is, the display control unit 52 performs control to display a guide image for irradiating the laser beam L1 to the target 20 in a superimposed manner on the image to be displayed on the display unit 51. Examples of the superimposed display of the guide image will be described later.

Next, as shown in step S210, an alignment of the target 20 is performed. The measurer U moves the target 20 to match the irradiation position of the laser beam L1 with reference to the guide image displayed on the display unit 51. Thereby, the tracking state of the target 20 can be restored.

Here, examples of superimposed displays of guide image shown in steps S209 will be described. The guide image is displayed in a superimposed manner, for example, in the form of augmented realities (ARs: Augmented Reality). The head mount display 50 is provided with the imaging unit 30, and the image of the real space captured by the imaging unit 30 is displayed on the display unit 51. The recognition unit 154 of the measurement control unit 15 obtains the information of the emission direction of the laser beam L1 based on the image captured by the imaging unit 30 and/or other information (such as distance measurement information). Further, the recognition unit 154 obtains coordinate information of an image displayed on the display unit 51 of the head-mounted display 50 and coordinate information of an object displayed on the display unit 51. These pieces of information are sent to the display control unit 52 of the head-mounted display 50, and the guide image is displayed in the form of the augmented reality.

In the example shown in FIG. 7, a graphic image CG1 corresponding to the optical axis of the laser beam L1 is displayed in a superimposed manner on the image actually displayed (superimposed display). The measurer U can refer to the state in which the graphic image CG1 showing the optical axis of the laser beam L1 is superimposed on the image of the real space displayed on the display unit 51 of the head-mounted display 50. The locus of the laser beam L1 may be difficult to see depending on the wavelength and the usage environment. However, the measurer U can refer to the optical axis of the laser beam L1 as the graphic image CG1 on the display unit 51 by the augmented reality displayed. The graphic image CG1 is displayed at a position on the display unit corresponding to the actual position of the optical axis of the laser beam L1.

In the augmented reality display, when the measurer U moves the position of the head-mounted display 50 (moves the direction of the head), the position of the graphic image CG1 moves in association with the movement of the image of the real space. By the measurer U moving the target 20 so as to match the graphic image CG1 of the optical axis, it is possible to restore the tracking state easily.

In the examples shown in FIG. 8A, a graphic image CG2 for guiding directions and angles in which the target 20 should be moved is superimposed on a real image of the target 20. The graphic image CG2 is, for example, an image of a geometrical figure such as an arrow, and is displayed in the vicinity of the real image of the target 20 in a superimposed manner.

That is, when the image of the target 20 is displayed on the display unit 51 of the head-mounted display 50, the graphic image CG2 is superimposed and displayed in the vicinity of the image. By capturing the image of the target 20 by the imaging unit 30, the recognition unit 154 recognizes the direction of the target 20 (the direction of the reflector) and recognizes a direction in which the target should be directed to receive the laser beam L1.

The graphic image CG2 is displayed so as to indicate a moving direction of the target 20 required to receive the laser beam L1. Therefore, by the measurer U moving the target 20 according to the graphic image CG2, it is possible to restore the tracking state easily.

In the examples shown in FIG. 8B, a graphic image CG3 for indicating the light receiving range of the target 20 is superimposed on a real image of the target 20. The graphic image CG3 is, for example, an image of a geometrical figure such as a conical shape image corresponding to the light receiving range capable of tracking the target 20, and is displayed on the actual light receiving range of the target 20 in a superimposed manner.

Similar to the examples shown in FIG. 8A, when the image of the target 20 is displayed on the display unit 51 of the head-mounted display 50, the graphic image CG3 is displayed in the vicinity of the image. By capturing the image of the target 20 by the imaging unit 30, the recognition unit 154 recognizes the direction of the target 20 (the direction of the reflector) and grasps the light receiving range based on the recognized direction of the target 20.

The graphic image CG3 is displayed so as to indicate the light receiving range of the target 20 required to receive the laser beam L1. Therefore, by the measurer U moving the target 20 according to the graphic image CG3, it is possible to restore the tracking state easily.

As described above, according to the embodiment, when the tracking state of the target 20 is interrupted, the measurer U can easily make the measuring apparatus to restore the tracking state. This makes it possible to improve the working efficiency of the measurement of the three-dimensional coordinates of the object W.

[Modification of Embodiment]

Although the present embodiment has been described above, the present invention is not limited to these examples. For example, in the present embodiment, the example in which the measurer U holds the target 20 and performs the measurement has been described. However, the present invention can be applied to a case where the target 20 is attached to a self-propelled robot such as a moving mechanism with a multi-axis arm and measurement is performed thereby. The shape of the graphic images in the guide display is not limited to the examples described above. Further, an invention in which a person skilled in the art appropriately add, delete, or change the design of the above-described embodiments, or a combination of the features of the respective embodiments as appropriate is also included in the scope of the present invention as long as it has the gist of the present invention.

What is claimed is:

1. A measuring apparatus that emits a light beam toward a target, captures and tracks the target, and measures three-dimensional coordinates of the target, comprising:

a light source for emitting light beam;

an angle control unit for controlling an emission angle of the light beam emitted from the light source so as to track the moving target;

an imaging unit for capturing an image of the target or an image of the vicinity of the target;

a recognition unit for recognizing the target or a specific portion including the target from an image captured by the imaging unit, wherein the angle control unit controls the emission angle of the light beam so as to emit the light beam toward the target or the specific portion including the target recognized by the recognition unit when the tracking of the target is released; and a light amount adjusting unit for reducing the amount of light of the light beam emitted from the light source when the tracking of the target is released.

2. The measuring apparatus according to claim 1, wherein the recognition unit recognizes a face portion of a measurer who hold the target from the image as the specific portion including the target, and the angle control unit controls the emission angle of the light beam so as to emit the light beam toward a position other than the face portion recognized by the recognition unit.

3. The measuring apparatus according to claim 1, wherein the recognition unit recognizes a contour area of a measurer who holds the target from the image, and the angle control unit controls the emission angle so that the light beam is emitted toward a specific position of the contour area recognized by the recognition unit.

4. The measuring apparatus according to claim 3, wherein the specific position is in the vicinity of the center of gravity position in the contour area.

5. The measuring apparatus according to claim 1, wherein the recognition unit recognizes the target as the specific portion, and the angle control unit controls the emission angle of the light beam so that the light beam is emitted toward a position of the target recognized by the recognition unit.

6. The measuring apparatus according to claim 1, wherein the recognition unit extracts a specific motion from the image to recognize a measurer who holds the target.

7. The measuring apparatus according to claim 1 further comprises:

a display unit that is wearable by a measurer who holds the target, and a display control unit that controls information displayed on the display unit, wherein the display control unit performs control to superimpose and display a guide image in the vicinity of the image of the target displayed on the display unit in order to emit the light beam toward the target.

8. The measuring apparatus according to claim 7, wherein the display control unit performs control to superimpose and display an object image indicating a light receiving direction and a light receiving region of the target as the guide image on the image of the target.

* * * * *